US006806844B2

(12) United States Patent
Azuma (10) Patent No.: US 6,806,844 B2
(45) Date of Patent: Oct. 19, 2004

(54) CALIBRATION SYSTEM FOR ARRAY ANTENNA RECEIVING APPARATUS

(75) Inventor: Tomohiro Azuma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/296,157

(22) PCT Filed: May 23, 2001

(86) PCT No.: PCT/JP01/04322
§ 371 (c)(1),
(2), (4) Date: Jun. 13, 2003

(87) PCT Pub. No.: WO01/91330
PCT Pub. Date: Nov. 29, 2001

(65) Prior Publication Data
US 2003/0236107 A1 Dec. 25, 2003

(30) Foreign Application Priority Data
May 23, 2000 (JP) .......................................... 2000-151159

(51) Int. Cl.[7] ............................................... H01Q 21/00
(52) U.S. Cl. ...................... 343/853; 455/67.4; 455/561; 455/562
(58) Field of Search .................................. 343/850, 853, 343/893; 455/67.4, 561, 562; 342/368, 380

(56) References Cited

U.S. PATENT DOCUMENTS

| 6,236,839 | B1 | * | 5/2001 | Gu et al. ................. 455/67.14 |
| 6,448,939 | B2 | * | 9/2002 | Maruta ....................... 343/853 |
| 6,615,024 | B1 | * | 9/2003 | Boros et al. ............. 455/67.14 |
| 6,690,953 | B2 | * | 2/2004 | Rexberg et al. .......... 455/562.1 |
| 6,708,020 | B1 | * | 3/2004 | Hiramatsu et al. ............ 455/65 |

* cited by examiner

Primary Examiner—Hoang V. Nguyen
(74) Attorney, Agent, or Firm—Sughrue Mion, PLLC (57) ABSTRACT

A calibration system of an array antenna receiving apparatus is used for cellular mobile communication systems. In the array antenna receiving apparatus of the present calibration system, a calibration time determining unit (111) determines an adaptive calibration time based on detection voltages of the total reception power inputted to antenna radio receiving units (104-1 to 104-N). Next, a calibration signal processing unit (112) detects phase/amplitude information of a calibration signal from multiplexing signals outputted from the antenna radio receiving units based on the longest calibration time among the calibration times. User signal processing units (108-1 to 108-M) correct outputs from the antenna radio receiving units based on the phase/amplitude information. Therefore, the deterioration of the reception sensitivity of a user signal to a mobile machine can be prevented and the reduction of the number of users in the cellular system can further be prevented.

6 Claims, 6 Drawing Sheets

CALIBRATION SYSTEM FOR ARRAY ANTENNA RECEIVING APPARATUS

TECHNICAL FIELD

The present invention relates to a calibration system of an array antenna receiving apparatus. More particularly, the present invention relates to a calibration system for correcting the change in phase (delay) and amplitude information between antenna radio receiving units in an array antenna receiving apparatus for adaptive antenna control.

BACKGROUND ART

Conventional cellular mobile communication systems require the high speed and the high quality of signals and the increase in subscriber capacity. For example, a method for reducing reception gain against the interference from another user and the interference due to delay waves is examined by using an array antenna receiving apparatus comprising a plurality of antenna devices having the high correlation. As a result, a reception directive pattern is formed so that the reception gain is increased in the incoming direction of a desired signal.

The array antenna receiving apparatus comprises the plurality of antenna radio receiving units. In general, in the above-mentioned array antenna receiving apparatus, the amplitudes and phases in the antenna radio receiving units connected to the antenna devices are individually varied every moment. The formatting of the reception directive pattern requires the correction of the variation of the amplitudes and phases. The above operation is called calibration.

For example, Japanese Unexamined Patent Publication (JP-A) No. 11-46180 discloses a conventional calibration system of the above-mentioned array antenna receiving apparatus. Japanese Unexamined Patent Publication No. 11-46180 prepares a technology in which a well-known signal is inputted to antenna radio receiving units connected to antenna devices and a result of demodulating a calibration signal is used. In this preparation, the change in phases (delays) and amplitudes of the antenna radio receiving units, as the demodulating results, which are individually varied every moment, are corrected.

Figure 1:
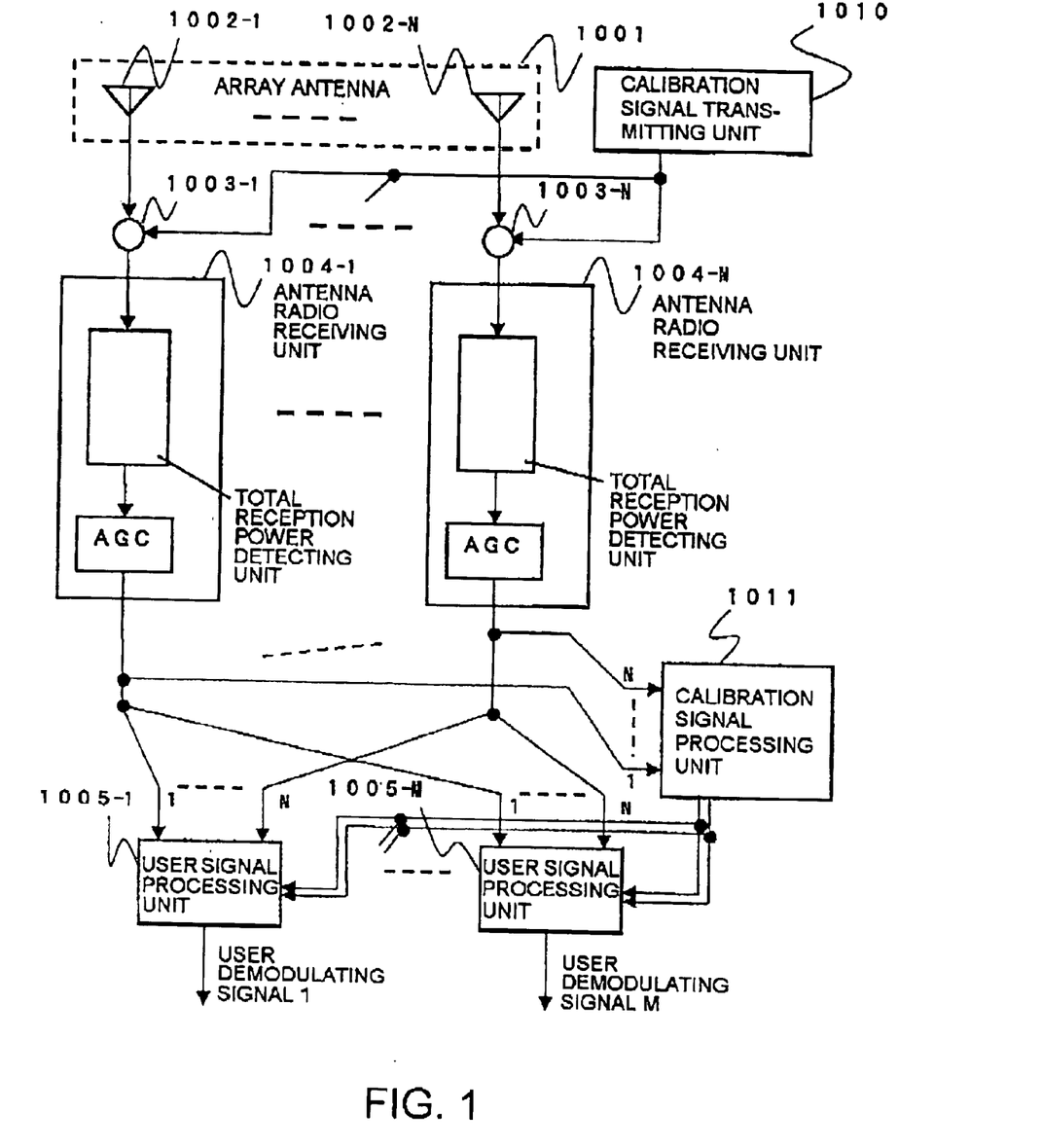
FIG. 1 is a block diagram of a calibration system of a conventional array antenna receiving apparatus.

FIG. 1 is a block diagram showing a calibration system of a conventional array antenna receiving apparatus.

The array antenna receiving apparatus comprises an array antenna 1001, multiplexing circuits 1003-1 to 1003-N corresponding to N antenna devices 1002-1 to 1002-N, antenna radio receiving units 1004-1 to 1004-N corresponding to the N antenna devices 1002-1 to 1002-N, user signal processing units 1005-1 to 1005-M corresponding to M users, a calibration signal transmitting unit 1010, and a calibration signal processing unit 1011.

The array antenna 1001 comprises N antenna devices 1002-1 to 1002-N. The N antenna devices 1002-1 to 1002-N are closely arranged so that reception signals from the antenna devices have a correlation, and receive signal obtained by multiplexing a desired signal and a plurality of interference signals.

One multiplexing circuit 1003-$i$ in the N multiplexing circuits multiplexes a calibration signal as an output from the calibration signal transmitting unit 1010 and a reception signal as an output from the antenna device 1002-$i$. The multiplexing circuit 1003-$i$ multiplexes an input signal at a radio band and outputs the multiplexing signal to the antenna radio receiving unit 1004-$i$. A multiplexing method is not particularly limited and a code multiplex is used as an example.

The antenna radio receiving unit 1004-$i$ comprises devices such as a low-noise amplifier, a band limiting filter, a mixer, a local transmitter, an AGC (Auto Gain Controller), an orthogonal detector, a low-pass filter, and an analog/digital converter (ADC). The antenna radio receiving unit 1004-$i$ subjects the signal inputted from the multiplexing circuit 1003-$i$ to amplification, frequency conversion from the radio band to a base band, orthogonal detection, analog/digital conversion, and so on. The antenna radio receiving unit 1004-$i$ further outputs the processed signal to the user signal processing unit 1005-$i$ and the calibration signal processing unit 1011. Normally, an AGC amplifier is used for keeping of a power level of the output signal constant independently of the power level of the input signal every antenna radio receiving unit.

The calibration signal processing unit 1011 receives signals from the antenna radio receiving units 1004-1 to 1004-N, extracts the calibration signal from the signals, detects phase/amplitude information of the antenna radio receiving units 1004-1 to 1004-N, and outputs the detected information to the user signal processing units 1005-1 to 1005-M. Herein, the calibration signal multiplexed to the input signal can be extracted.

A user signal processing unit 1005-$j$ corresponding to a user $j$ inputs outputs from the antenna radio receiving units 1004-1 to 1004-N and the phase/amplitude information of the antenna radio receiving units 1004-1 to 1004-N as outputs from the calibration signal processing unit 1011. The user signal processing unit 1005-$j$ corrects the inputs from the antenna radio receiving units 1004-1 to 1004-N by using the phase/amplitude information of the antenna radio receiving units 1004-1 to 1004-N as the outputs from the calibration signal transmitting unit 1010, and increases the reception gain against the incoming direction of the signal to the target user $j$. On the other hand, the user signal processing unit 1005-$j$ forms a reception directive pattern so that the reception gain is reduced against the interference from another user and the interference due to the delay waves, and outputs a user demodulating signal $j$ which is received by the reception directive pattern.

The calibration signal transmitting unit 1010 generates a calibration signal at the base band and subjects the generated signal to digital/analog conversion and frequency conversion from the base band to the radio band. Thereafter, the calibration signal transmitting unit 1010 forms the calibration signal having the same frequency band as that of reception signals of the antenna devices 1002-1 to 1002-N, and outputs the formed signal to the multiplexing circuits 1003-1 to 1003-N at arbitrary power levels. In this case, the calibration signal processing unit 1011 detects the phase/amplitude information of the antenna radio receiving units 1004-1 to 1004-N every reception power by changing the calibration signals to have a plurality of power levels.

The signals received by each of the N antenna devices 1002-1 to 1002-N include a users desired signal component, an interference signal component, and thermal noise. Further, the desired signal component and the interference signal component include multi-path components, respectively. Generally, the signal components comes in different directions.

The conventional array antenna receiving apparatus shown in FIG. 1 identifies the signal components in different incoming directions and forms the reception directive pattern by using the phase/amplitude information of the signals received by the N antenna devices 1002-1 to 1002-N.

In this case, the antenna radio receiving units 1004-1 to 1004-N generate the change in phase/amplitude therein.

Then, information different from the phase/amplitude information of the signals received by each of the original antenna devices 1002-1 to 1002-N is given to the user signal processing units 1005-1 to 1005-M. Thus, the signal components are not accurately identified and an ideal reception directive pattern is not formed.

The calibration signals having the same frequency band as those of the reception signals from the antenna devices 1002-1 to 1002-N are multiplexed thereto. The calibration signal processing unit 1011 detects the phaselamplitude information of the calibration signals extracted from the outputs from the antenna radio receiving units 1004-1 to 1004-N, thereby correcting the phase/amplitude information given to the user signal processing units 1005-1 to 1005-M.

The multiplex of the calibration signals enables the calibration upon operating the array antenna receiving apparatus. That is, the calibration signal is multiplexed to the reception signal and only the calibration signal component can be extracted. For example, code multiplex is used.

A non-linear circuit included in the antenna radio receiving units 1004-1 to 1004-N, in particular, the AGC has the change in phase/amplitude varied depending on the reception power level. Therefore, the calibration signal processing unit 1011 extracts the calibration signals of the outputs from the antenna radio receiving units 1004-1 to 1004-N and detects the phase/amplitude information while changing the power levels of the calibration signals outputted by a power level varying circuit of the calibration signal transmitting unit 1010. Thus, the amount of correction applied to the phase/amplitude information given to the user signal processing units 1005-1 to 1005-M is determined every power level of the calibration signal.

The array antenna receiving apparatus having the above-mentioned calibration means can correct the phase/amplitude information given to the user signal processing units 1005-1 to 1005-M if the change in phase/amplitude is caused in the antenna radio receiving units 1004-1 to 1004-N upon operating the array antenna receiving apparatus. Further, the calibration with high accuracy can be performed corresponding to the power levels of the reception signals.

Consequently, the conventional array antenna receiving apparatus shown in FIG. 1 accurately identifies the signal components varied depending on the incoming directions by using the phase/amplitude information of the reception signals of the N antenna devices 1002-1 to 1002-N, and forms the ideal reception directive pattern.

However, the calibration system of the conventional array antenna receiving apparatus is not suitable to the array antenna receiving apparatus upon operation because it has the following problems.

First, the reception sensitivity of the array antenna receiving apparatus excessively deteriorates in case that the calibration signals are changed at a plurality of power levels upon operating the array antenna receiving apparatus. Further, the phase/amplitude information of the antenna radio receiving units is detected every reception power, thereby performing the calibration. Because the calibration signal is entirely the interference wave for the desired wave as a user signal inputted from the antenna from a mobile machine and, in particular, if the calibration signal with a high level is inputted, the interference signal component is increased. Secondarily, the calibration reduces the number of users of the system. Because the calibration signal becomes the interference wave and the ratio of the user signal from the mobile machine to the interference signal deteriorates, and a transmission output of the mobile machine is increased to demodulate the signal to have a desired signal quality in a base station apparatus.

Accordingly, the present invention is devised to solve the above-mentioned problems and it is an object of the present invention to provide the following calibration system. First, the sensitivity deterioration due to the calibration signal is prevented in the array antenna receiving apparatus upon operation and, further, the calibration with high accuracy can be performed irrespective of a simple structure. Secondarily, there is almost no reduction of the number of users of the cellular system.

DISCLOSURE OF INVENTION

A calibration system of an array antenna receiving apparatus according to the present invention relates to a calibration system of an array antenna receiving apparatus for inputting a multiplexing signal which is obtained by multiplexing a well-known calibration signal to signals received from antenna devices forming an array antenna corresponding to the antenna devices, for detecting phase/amplitude information of the calibration signal every antenna radio receiving unit connected to each antenna device, based on the calibration signal extracted from the multiplexing signals, and for correcting a user signal to a mobile machine which is received every antenna radio receiving unit connected to each antenna device based on the phase/amplitude information. For extracting the calibration signal and assuring the ratio between the calibration signal to be need for calibration and the interference signal, the Calibration system of the array antenna apparatus is characterized by comprising radio control means for detecting a detection voltage of the total reception power of the inputted multiplexing signal, for gain controlling the received multiplexing signal in accordance with the detection voltage, and for outputting the signal controlled, and signal processing means for receiving the detection voltage of the total reception power from the control means, for determining an adaptive calibration time every antenna device based on the detection voltage, and for detecting the phase/amplitude information of the calibration signal from the multiplexing signal based on the longest calibration time among the calibration times.

Specifically, the calibration system of the array antenna receiving apparatus comprises a calibration radio transmitting unit for transmitting a well-known calibration signal, an antenna radio receiving unit connected to corresponding antenna devices forming an array antenna, for inputting a signal multiplexing the calibration signal to a signal received from each antenna device, a calibration signal processing unit for detecting phase/amplitude information of the calibration signal every antenna radio receiving unit based on the calibration signal extracted from each of the antenna radio receiving units, and a user signal processing unit for correcting a multiplexing signal, which is received by each of the antenna radio receiving units based on the phase/amplitude information every antenna detected by the calibration signal processing unit.

The calibration system of the array antenna receiving apparatus further comprises a radio control unit arranged to each of the antenna radio receiving units, for outputting an AGC control signal for controlling gain in accordance with a detection voltage of the total reception power inputted to the corresponding antenna radio receiving unit, and a calibration time determining unit for determining and outputting an adaptive calibration time every antenna radio receiving unit based on the detection voltage of the total reception power inputted to each of the antenna radio receiving units. Therefore, each of the antenna radio receiving units detects the detection voltage of the total reception power of the inputted multiplexing signal, outputs the detection voltage to the radio control unit, and outputs gain of the received multiplexing signal by gain in accordance with the AGC control signal received from the corresponding radio control unit. And the calibration signal processing unit detects and outputs the phase/amplitude information of the calibration signal from the multiplexing signal outputted from each of the antenna radio receiving units based on the longest calibration time among the calibration times of the antenna radio receiving units outputted from the calibration time determining unit.

The calibration signal transmitted by the calibration radio transmitting unit is sent by fixed power which is sufficiently lower than thermal noise power in the array antenna receiving apparatus. The multiplexing signals outputted from the antenna radio receiving units are added by using the common mode by the longest calibration time and the calibration signals included in the multiplexing signals are averaged. Thus, the phase/amplitude information of the calibration signal is detected every antenna radio receiving unit. That is, the phaselamplitude information of the calibration signal by varying the calibration period using the calibration signal having the fixed low power which does not cause the deterioration of the sensitivity.

With the above-mentioned structure, the sensitivity deterioration due to the calibration signal can be prevented. The reduction of the number of users in the cellular system can further be prevented. Moreover, the phase/amplitude information can accurately be corrected with simple structure.

The calibration signal transmitted from the calibration radio transmitting unit may be sent by the fixed power which is sufficiently lower than thermal noise power in the array antenna receiving apparatus. When the calibration signal processing unit detects the phase/amplitude information, the multiplexing signals outputted from the antenna radio receiving units are added by using the common mode by the longest calibration time and the calibration signals included in the multiplexing signals are averaged. Thus, the phase/amplitude information of the calibration signal may be detected every antenna radio receiving unit. Further, the phase/amplitude information of each antenna radio receiving unit may be detected every calibration period having a period length of the longest calibration time.

The calibration time determining unit may determine and output the adaptive calibration time every antenna radio receiving unit based on the AGC control signal from each of the radio control units, in place of the detection voltage of the total reception power.

BEST MODE FOR CARRYING OUT THE INVENTION

A detailed description is made about the present invention with reference to the drawings.

Figure 2:
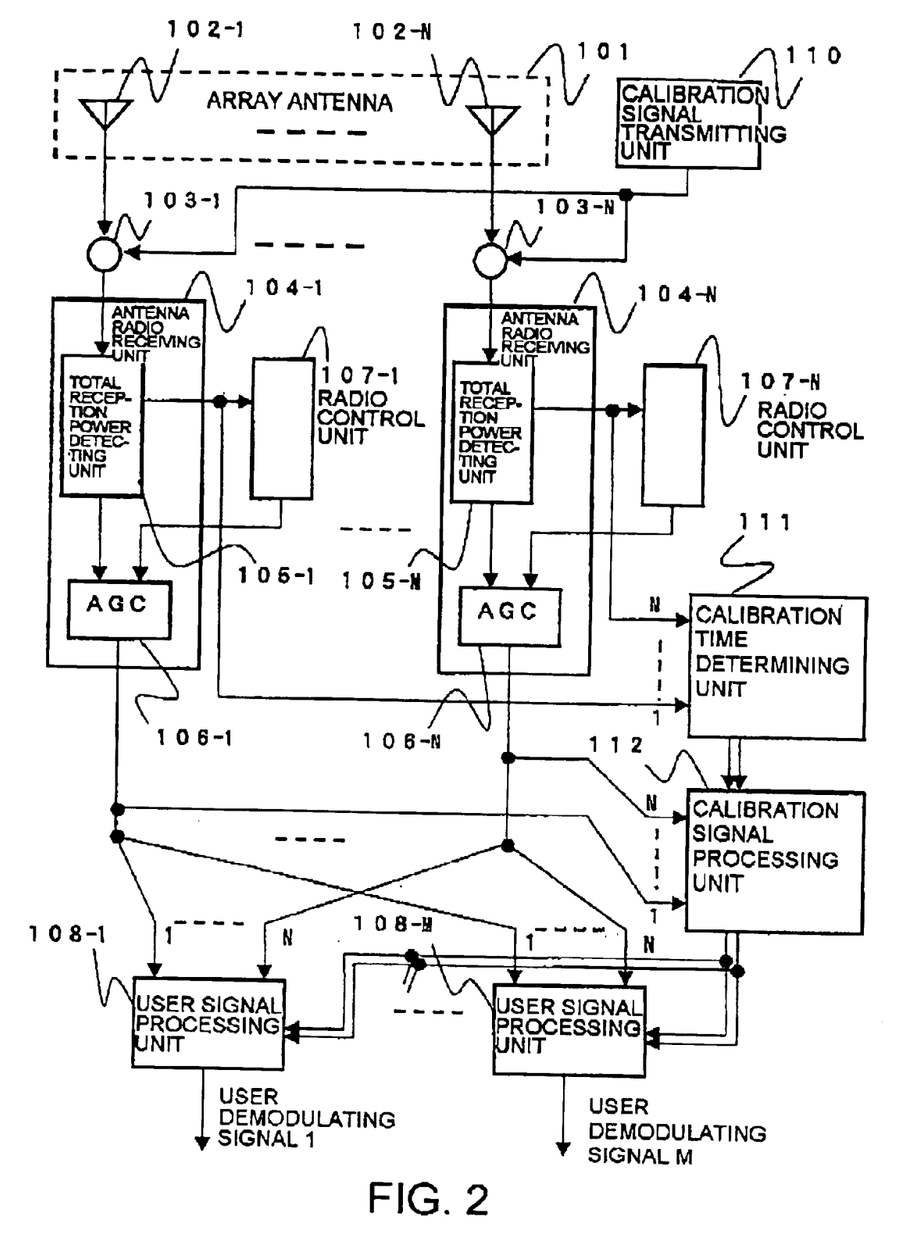
FIG. 2 is a block diagram showing a calibration system of an array antenna receiving apparatus according to one embodiment of the present invention.

FIG. 2 is a block diagram showing a calibration system of an array antenna receiving apparatus according to one embodiment of the present invention.

The array antenna receiving apparatus comprises N (N is an integer not less than 2) antenna devices 102-1 to 102-N, multiplexing circuits 103-1 to 103-N, antenna radio receiving units 104-1 to 104-N that include total reception power detecting units 105-1 to 105-N and AGC (Auto Gain Controller) 106-1 to 106-N respectively, user signal processing units 108-1 to 108-M corresponding to M users, a calibration signal transmitting unit 110, a calibration time determining unit 111, and a calibration signal processing unit 112.

The array antenna 101 comprises N antenna devices 102-1 to 102-N that are closely arranged with high antenna-correlation. One side of a multiplexing circuit 103-$i$ corresponding to an antenna device 102-$i$ in the N antenna devices is connected to the antenna device 102-$i$ and the calibration signal transmitting unit 110 and inputs the outputs therefrom. The multiplexing circuit 103-$i$ multiplexes the two input signals at a radio band and outputs the multiplexing signals to the antenna radio receiving unit 104-$i$ connected to the other side of the multiplexing circuit 103-$i$.

The antenna radio receiving unit 104-$i$ mainly comprises a low-noise amplifier, a band limiting filter, a mixer, a local transmitter, a total reception power detecting unit 105-$i$, an AGC 106-$i$, an orthogonal detector, a low-pass filter, and an analog/digital converter. Herein, in the main components, only the total reception power detecting unit 105-$i$ and the AGC 106-$i$ as a feature of the present invention, different from the conventional ones, are shown and described.

The total reception power detecting unit 105-$i$ receives an output from the multiplexing circuit 103-$i$ and the inputted multiplexing signal is outputted to the AGC 106-$i$. A detection voltage of the multiplexing signal is outputted to a radio control unit 107-$i$ and the calibration time determining unit 111.

The AGC 106-$i$ amplifies or attenuates the multiplexing signal inputted from the total reception power detecting unit 105-$i$ in accordance with an AGC control voltage inputted from the radio control unit 107-$i$, and always outputs constant power to all the user signal processing units 108-1 to 108-M and the calibration signal processing unit 112.

The radio control unit 107-$i$ that is added to the above-mentioned conventional structure outputs the AGC control voltage to the AGC 106-$i$ in accordance with the detection voltage inputted from the total reception power detecting unit 105-$i$.

A user signal processing unit 108-$j$ corresponding to a user j as one of the M users inputs outputs from the antenna radio receiving units 104-1 to 104-N and the phase/amplitude information corresponding to the antenna radio receiving units 104-1 to 104-N as outputs from the calibration signal processing unit 112. The user signal processing unit 108-j corrects the outputs from the antenna radio receiving units 104-1 to 104-N by using the phaselamplitude information of the antenna radio receiving units 104-1 to 104-N and increases the reception gain against the incoming direction of the user signal corresponding to the user j. On the other hand, the user signal processing unit 108-j forms the reception directive pattern so that the reception gain is reduced against the interference from another user and the interference due to the delay wave. The user signal processing unit 108-j outputs a user demodulating signal j of the user j, which is r ceiv d by the formed reception directive pattern.

The calibration signal transmitting unit 110 generates the calibration signal at a base band and generates an arbitrary symbol pattern as the calibration signal. The calibration signal transmitting unit 110 subjects the generated calibration signal at the base band to digital/analog conversion, frequency conversion from the base band to the radio band, and the like, and outputs the calibration signal having well-known fixed power to all the multiplexing circuits 103-1 to 103-N.

The calibration time determining unit 111 which is added to the above-mentioned conventional structure obtains an adaptive calibration time for each of the antenna radio receiving units 104-1 to 104-N based on the detection voltages inputted from the total reception power detecting units 105-1 to 105-N, and outputs the obtained calibration time to the calibration signal processing unit 112.

Unlike the conventional calibration signal processing unit, the calibration signal processing unit 112 receives the adaptive calibration time for each of the antenna radio receiving units 104-1 to 104-N from the calibration time determining unit 111.

The calibration signal processing unit 112 inputs outputs from the antenna radio receiving units 104-1 to 104-N and the calibration time received from the calibration time determining unit 111, extracts the multiplexed calibration time to the outputs from the antenna radio receiving units 104-1 to 104-N, detects the phase/amplitude information of the antenna radio receiving units 104-1 to 104-N, and outputs the information of all the antenna radio receiving units 104-1 to 104-N to all the user signal processing units 108-1 to 108-M. The calibration signal is a coding multiplexing signal and then the calibration signal is extracted by inverse diffusion.

Next, the operation will be described with reference to FIG. 2.

An array antenna 101 comprises N antenna devices 102-1 to 102-N. The N antenna devices 102-1 to 102-N are closely arranged so that reception signals of the antenna devices have a high correlation, and receive signals obtained by multiplexing a desired signal and a plurality of interference signals. However, actually, the increase in antenna devices reduces the correlation between the antenna devices which are not adjacent and far from each other and causes large variation in power of the received multiplexing signals. That is, the antenna devices of the array antenna receiving apparatus receive different power.

On the other hand, the calibration signal at the base band which is generated by the calibration signal transmitting unit 110 is frequency-converted and amplified, and is sent as well-known and fixed power.

Each of the multiplexing circuits 103-1 to 103-N is connected to the antenna devices 102-1 to 102-N and one calibration signal transmitting unit 110 at one side thereof, and inputs the calibration signal outputted from the calibration signal transmitting unit 110 and the outputted signal from the antenna devices 102-1 to 102-N. Each of the multiplexing circuits 103-1 to 103-N multiplexes the two inputs at the radio band and outputs the multiplexed signals to the antenna radio receiving units 104-1 to 104-N connected to the other side thereof.

For example, when the reception sensitivity of the calibration signal of a desired signal as a user signal from a mobile machine deteriorates to 0.2 dB or less, equivalently, the noise power level deteriorates to 0.2 dB. Therefore, it is assumed that the thermal noise power level is 0 dB, the following formula may be calculated.

$$0.2 > 10 \times \log(10^{0/10} + 10^{X/10})$$

Thus, a relation of "x<−13.267 dB" is obtained. Accordingly, transmission power of the calibration signal is to be fixed to a level lower than the thermal noise power level, that is, a level lower than "−13.267 dB".

Figure 3:
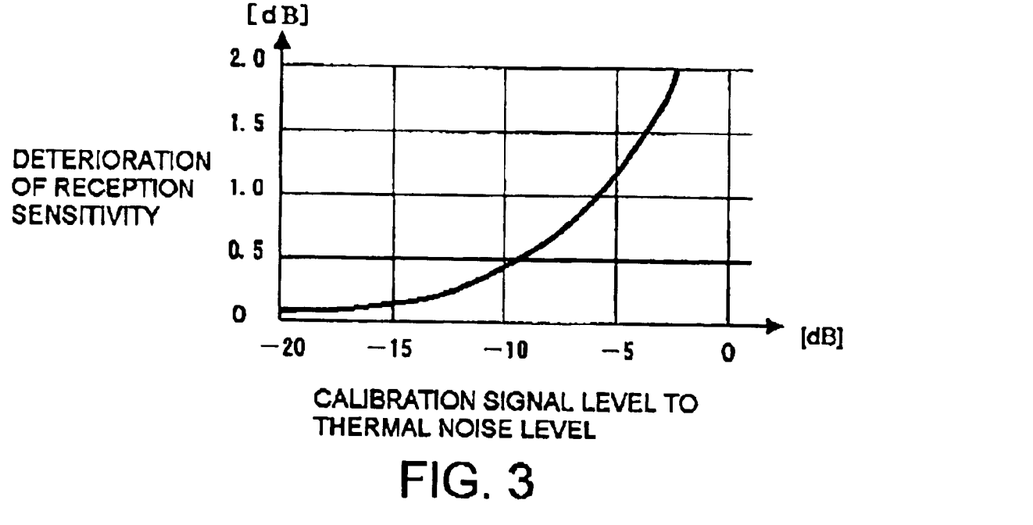
FIG. 3 is a diagram showing one format of characteristics for the amount of deterioration of the reception sensitivity of the calibration signal.

FIG. 3 shows the amount of deterioration of the reception sensitivity of the calibration signal.

Herein, output signals from the multiplexing circuits 103-1 to 103-N are the calibration signal, desired signal, interference signal, and thermal noise. When it is assumed that the total of the output signals are the total reception power, the calibration signal and the thermal noise have constant power and, therefore, the differences of the total power outputted from the multiplexing circuits become the differences of power obtained by adding the desired signal and the interference signal which are inputted from the antenna devices.

Consider the two antenna radio receiving units 104-1 and 104-N hereinbelow. The total reception power detecting unit 105-1 receives the output from the multiplexing circuit 103-1 and the inputted multiplexing signal is outputted to the AGC 106-1. The total reception power detecting unit 105-N receives the output from the multiplexing circuit 103-N and the inputted multiplexing signal is outputted to the AGC 106-N. However, the total reception power detecting units 105-1 and 105-N output detection voltages of the signals multiplexed to the radio control units 107-1 and 107-N respectively and the calibration time determining unit 111. For example, it is assumed that the detection voltage of the total reception power detecting unit 105-1 of the total reception power inputted to the antenna radio receiving unit 104-1 is 2.5V and the detection voltage of the total reception power detecting unit 105-N of the total reception power inputted to the antenna radio receiving unit 104-N is 2.8V. The difference 0.3V of the detection voltages becomes the difference between "addition of the desired signal and the interference signal" among all the power inputted to the antenna radio receiving unit 104-1 and "addition of the desired signal and the interference signal" among all the power inputted to the antenna radio receiving unit 104-N.

Consequently, the "addition of the desired signal and the interference signal" as the interference signal for the calibration signal is inputted to the antenna radio receiving unit 104-N by the detection voltage of 0.3V. This means that a C/N ratio of the calibration signal is not constant. This state is shown in FIGS. 4 to 7.

Figure 4:
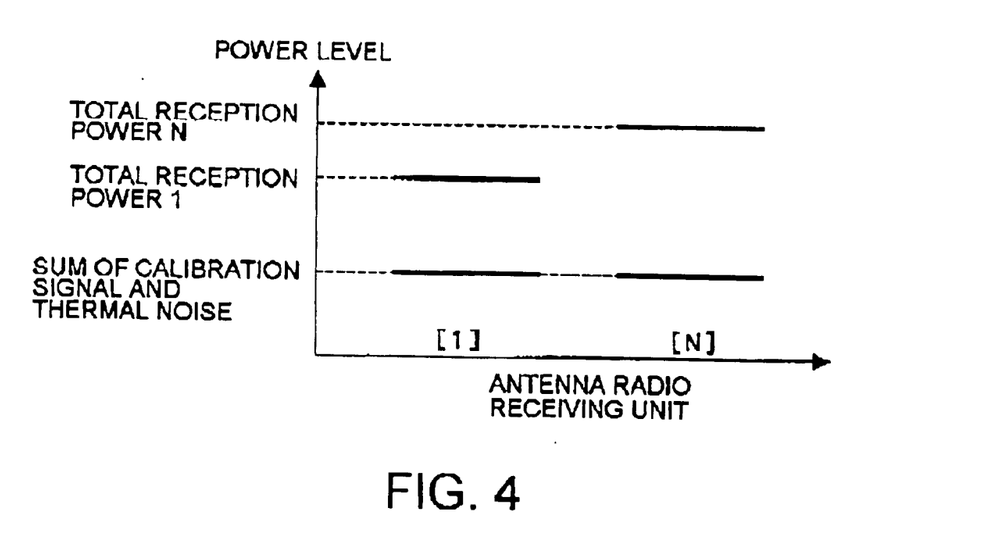
FIG. 4 is a diagram showing one format of the distribution of the total reception power before an AGC in each antenna receiving unit.
Figure 5:
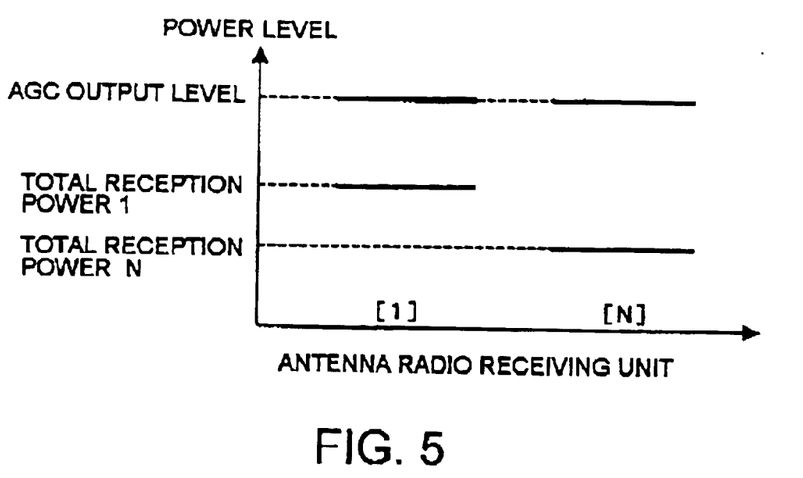
FIG. 5 is a diagram showing another format of the distribution of the total reception power after the AGC in each antenna receiving unit.

FIG. 4 is a diagram showing the power distribution of the antenna radio receiving units before gain control by the AGC. FIG. 5 is a diagram showing the power distribution of the receiving units after the gain control by the AGC. FIG.

Figure 6:
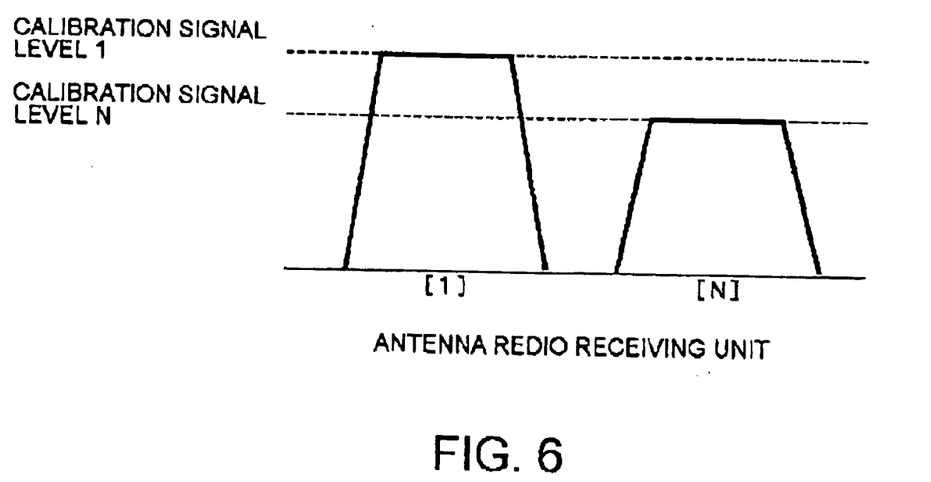
FIG. 6 is a diagram showing one format of the calibration signal after inverse diffusion from each antenna receiving unit.

6 is a diagram showing the C/N ratio of the calibration signals which are averaged by using the common-mode addition by the same time by the calibration signal processing unit 112.

The detection voltages outputted by the total reception power detecting units 105-1 and 105-N are inputted to the radio control units 107-1 and 107-N respectively and the AGC control voltage is outputted so that output power of the AGC 106-1 to AGC 106-N is constant. The AGCs 106-1 and 106-N control gain in accordance with the control voltage outputted from the radio control units 107-1 and 107-N corresponding to the AGCs. Further, the AGCs 106-1 and 106-N output the multiplexing signal which is amplified or attenuated to all the user signal processing units 108-1 to 108-M corresponding to the users 1 to M and to the calibration signal processing unit 112. In this case, the AGCs 1061 and 106N similarly control the gain of the calibration signal and the interference signal and therefore the C/N ratio of the calibration signal is not changed.

The detection voltages detected by the total reception power detecting units 105-1 and 105-N are simultaneously outputted to the calibration time determining unit 111. Therefore, the calibration time determining unit 111 outputs the calibration times corresponding to the detection voltages to the calibration signal processing unit 112. Herein, it is defined that the calibration time is the total time of a processing time for correction and an averaging time obtained by inversely diffusing the calibration signals and by using the common-mode addition in the calibration signal processing unit 112. Further, it is assumed that the processing time is constant. Information outputted to the calibration signal processing unit 112 from the calibration time determining unit 111 is calibration time and the number of the antenna radio receiving unit. As described above, since the calibration signal and the noise power are always constant, the calibration time determining unit 111 uniquely determines the calibration times of the antenna radio receiving units 104-1 and 104-N only by the detection voltages from the total reception power detecting units 105-1 and 105-N.

The calibration signal processing unit 112 receives the outputs from the antenna radio receiving units 104-1 and 104-N. The calibration signal processing unit 112 extracts the calibration signal multiplexed to the outputs of the antenna radio receiving units 104-1 and 104-N, detects the phase/amplitude information of the antenna devices 102-1 and 102-N, and outputs the detected information to the corresponding user signal processing units 108-1 and 108-M. In this case, the calibration signal processing unit 112 selects the longest calibration time among the calibration times outputted from the calibration time determining unit 111, and performs the averaging processing by adding the calibration signals by the common mode in accordance with the selected calibration times.

Figure 7:
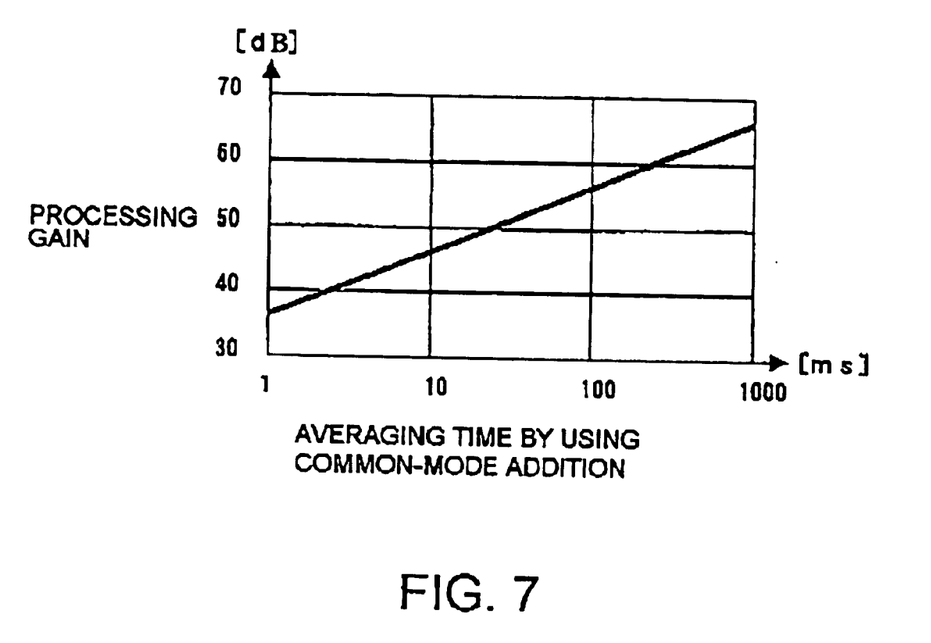
FIG. 7 is a diagram showing one format of correlative characteristics between processing gain and averaging time using the common-mode addition.

The processing gain of the calibration signal depends only on the time for averaging the demodulated calibration signals by using the common-mode addition. Therefore, in order to obtain a predetermined C/N ratio required for comparing the phase and amplitude information, the averaging processing time obtained by using the common-mode addition may be added to the antenna radio receiving unit having the largest interference signal components for the calibration signal. FIG. 7 shows the processing gain for the averaging processing time using the common-mode addition. Referring to FIG. 7, since the ratio of the calibration signal to the interference signal is varied depending on the antenna radio receiving units, as will be understood, the C/N ratio after the inverse diffusion necessary to compare the phase/amplitude information with high accuracy requires the averaging processing time using the common-mode addition varied depending on the antenna radio receiving units.

With regard to a calibration period, it is assumed that the calibration period corresponds to the longest calibration time among the calibration times of the antenna radio receiving units which are outputted from the calibration time determining unit 111. That is, when the power of the interference signal for the calibration signal is low, the calibration period may be short. On the other hand, when the power of the interference signal for the calibration signal is high, a long calibration period is required. Therefore, when the previous calibration operation ends, the next calibration operation starts and the calibration period for the next calibration is determined by the output result of the calibration time determining unit 111. When the detection voltage of the total reception power detecting unit 105-1 of the total reception power inputted to the above-mentioned antenna radio receiving unit 104-1 is 2.5V and the detection voltage of the total reception power detecting unit 105-N of the total reception power inputted to the antenna radio receiving unit 104-N is 2.8V, the calibration time necessary for the antenna radio receiving unit 104-N having the high detection voltage becomes the calibration time for the present calibration.

The user signal processing units 108-1 to 108-M corresponding to the user-1 to user-M respectively receive the outputs from the antenna radio receiving units 104-1 and 104-N and the phase/amplitude information of the antenna devices 102-1 and 102-N as the outputs of the calibration signal processing unit 112. For example, the user signal processing unit 108-j corresponding to the user-j corrects the outputs from the antenna radio receiving units 104-1 and 104-N by using the phase/amplitude information of the antenna devices 102-1 and 102-N and simultaneously forms the reception directive pattern so that the reception gain is increased against the user signal incoming direction of the user-j and the reception gain is reduced against the interference from another user and the interference due to the delay wave. Further, the user signal processing unit 108-j outputs a user demodulating signal-j which is received by the reception directive pattern.

As mentioned above, the calibration time necessary for detecting the phase/amplitude information of the calibration signal is informed from the calibration time determining unit by using the calibration signal of the fixed power having the well-known level, thereby performing the calibration without deteriorating the reception sensitivity upon operating the system.

Figure 8:
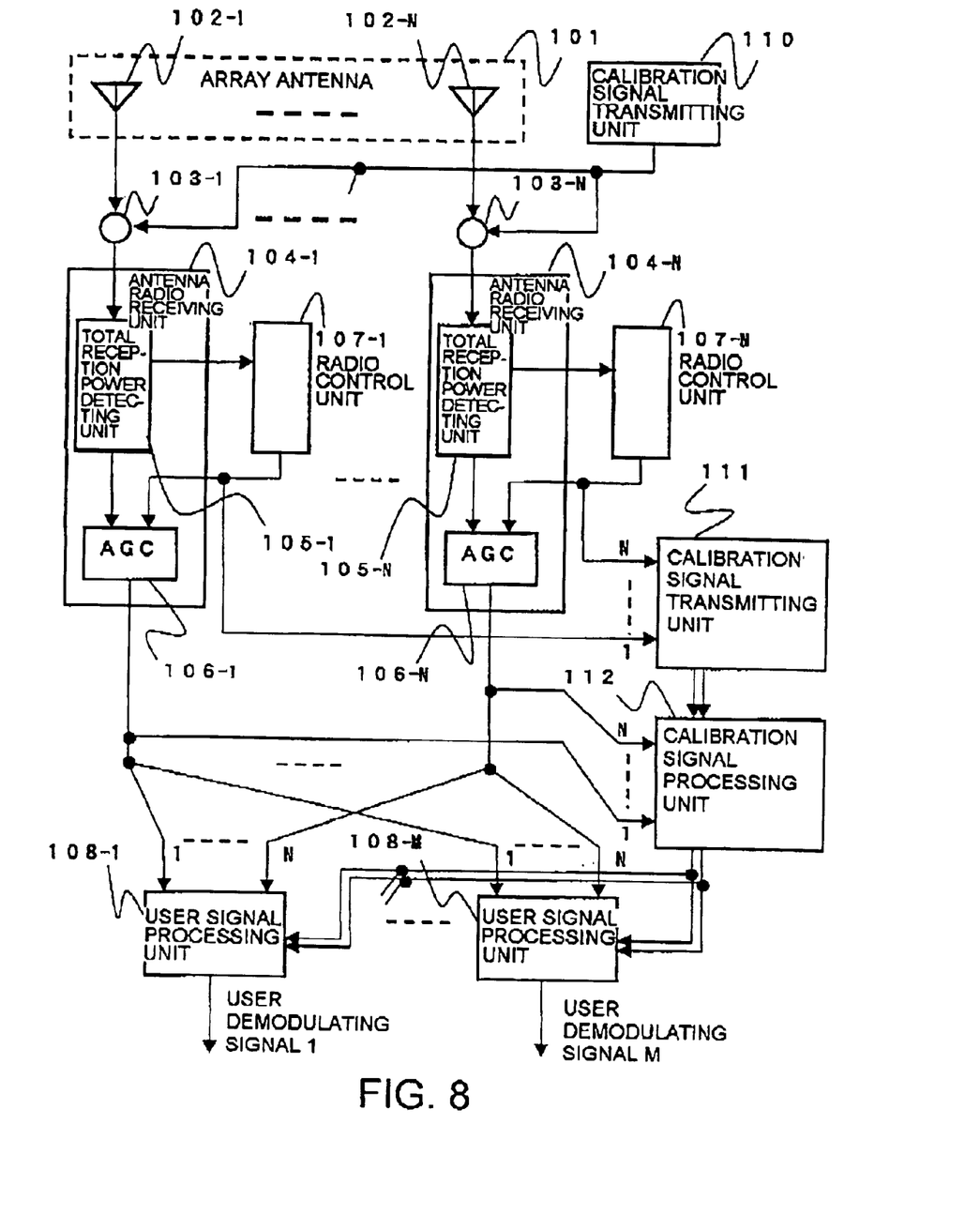
FIG. 8 is a block diagram showing a calibration system of an array antenna receiving apparatus according to another embodiment of the present invention.

Next, an array antenna receiving apparatus will be described with reference to FIG. 8 according to another embodiment. FIG. 8 is a block diagram showing an array antenna receiving apparatus different from that in FIG. 2 and components are the same as those described with reference to FIG. 2 and are designated by the same reference numerals.

Referring to FIG. 8, an input of the calibration time determining unit 111 is unlike that in FIG. 2. Referring back to FIG. 2, the detection voltages outputted from the total reception power detecting units 105-1 to 105-N in the antenna radio receiving units are inputted. However, referring to FIG. 8, the AGC control signals outputted to the AGCs 106-1 to 106-N by the radio control units 107-1 to 107-N are inputted and the calibration times necessary for the antenna radio receiving units are outputted to the calibration signal processing unit 112. With any structure, the same operations and advantages are obtained.

As mentioned above, in the calibration system of the present invention, first, the calibration time determining unit determines the adaptive calibration time every antenna radio receiving unit based on the detection voltage of the total reception power inputted to the antenna radio receiving unit. Next, in the calibration system, the calibration signal processing unit detects and outputs the phase/amplitude information of the calibration signal from the multiplexing signal outputted from the antenna radio receiving unit based on the longest calibration time among the determined calibration times. Therefore, in the calibration system of the present invention, the sensitivity caused by the calibration signal does not deteriorate.

Secondarily, in the calibration system, in order to obtain the C/N ratio necessary for comparing the phase/amplitude information of the, calibration signals, the averaging processing time using the common-mode addition of the calibration signals is controlled. Therefore, it is prevented that the calibration signal becomes the interference signal and this deteriorates the ratio of the user signal from the mobile machine to the interference signal, and it is further prevented that the transmission output of the mobile machine for demodulating the signal to have the desired signal quality in the base station apparatus is increased. As a result, in the calibration system, the number of users in the cellular system is not reduced.

Thirdly, in the calibration system, only the time for adding the calibration signals by the common mode and averaging the time is controlled for the total reception power received by the antenna receiving unit. Thus, the desired C/N ratio of the calibration signal after the inverse diffusion can always be satisfied. Accordingly, in the calibration system, the phase/amplitude information can accurately be corrected with simple structure.

INDUSTRIAL APPLICABILITY

As mentioned above, the calibration system of the array antenna receiving apparatus according to the present invention is suitable to a calibration system for correcting the change in phase (delay) and amplitude information between antenna radio receiving units in an array antenna receiving apparatus for adaptive antenna control such as a cellular mobile communication system.

What is claimed is:

1. A calibration system of an array antenna receiving apparatus, for inputting a multiplexing signal which is obtained by multiplexing a well-known calibration signal to signals received from antenna devices forming an array antenna corresponding to the antenna devices, for detecting phase/amplitude information of the calibration signal every antenna radio receiving unit connected to each antenna device, based on the calibration signal extracted from the multiplexing signals, and for correcting a user signal to a mobile machine which is received every antenna radio receiving unit connected to each antenna device based on the phase/amplitude information, said calibration system comprising:

radio control means for detecting a detection voltage of the total reception power of the inputted multiplexing signal and for gain controlling the received multiplexing signal in accordance with the detection voltage and for outputting the controlled signal as a signal for extracting the calibration signal; and signal processing means for receiving the detection voltage of the total reception power from said control means, for determining an adaptive calibration time every antenna device based on the detection voltage, and for detecting and outputting the phase/amplitude information of the calibration signal from the multiplexing signal based on the longest calibration time among the calibration times.

2. A calibration system of an array antenna receiving apparatus comprising a calibration radio transmitting unit for transmitting a well-known calibration signal, an antenna radio receiving unit connected to corresponding antenna devices forming an array antenna, for inputting a signal multiplexing the calibration signal to a signal received from each antenna device, a calibration signal processing unit for detecting phase/amplitude information of the calibration signal every antenna radio receiving unit based on the calibration signal extracted from each of said antenna radio receiving units, and a user signal processing unit for correcting a user signal to a mobile machine, which is received by each of said antenna radio receiving units based on the phase/amplitude information every antenna detected by said calibration signal processing unit, said calibration system further comprising:

a radio control unit arranged to each of said antenna radio receiving units, for outputting an AGC control signal for controlling gain in accordance with a detection voltage of the total reception power inputted to the corresponding antenna radio receiving unit; and a calibration time determining unit for determining and outputting an adaptive calibration time every antenna radio receiving unit based on the detection voltage of the total reception power inputted to each of said antenna radio receiving units, wherein each of said antenna radio receiving unit detects the detection voltage of the total reception power of the inputted multiplexing signal, outputs the detection voltage to said radio control unit, and outputs gain of the received multiplexing signal by gain in accordance with the AGC control signal received from the corresponding radio control unit, and said calibration signal processing unit detects and outputs the phase/amplitude information of the calibration signal from the multiplexing signal outputted from each of said antenna radio receiving units based on the longest calibration time among the calibration times of the antenna radio receiving units outputted from said calibration time determining unit.

3. A calibration system of an array antenna receiving apparatus according to claim 2, wherein said calibration radio transmitting unit transmits the calibration signal which is multiplexed and inputted to each of said antenna radio receiving units by fixed power which is sufficiently lower than thermal noise power in said array antenna receiving apparatus.

4. A calibration system of an array antenna receiving apparatus according to claim 2, wherein said calibration signal processing unit adds the multiplexing signals outputted from said antenna radio receiving units by using the common mode by the longest calibration time and averages the calibration signals included in the multiplexing signals, thereby detecting the phase/amplitude information of the calibration signal every antenna radio receiving unit.

5. A calibration system of an array antenna receiving apparatus according to claim 2, wherein said calibration signal processing unit detects and outputs the phase/amplitude information of each antenna radio receiving unit every calibration period having a period length of the longest calibration time.

6. A calibration system of an array antenna receiving apparatus according to claim 2, wherein said calibration time determining unit determines and outputs the adaptive calibration time every antenna radio receiving unit based on the AGC control signal from each of said radio control units, in place of the detection voltage of the total reception power.

* * * * *